Figure 8:
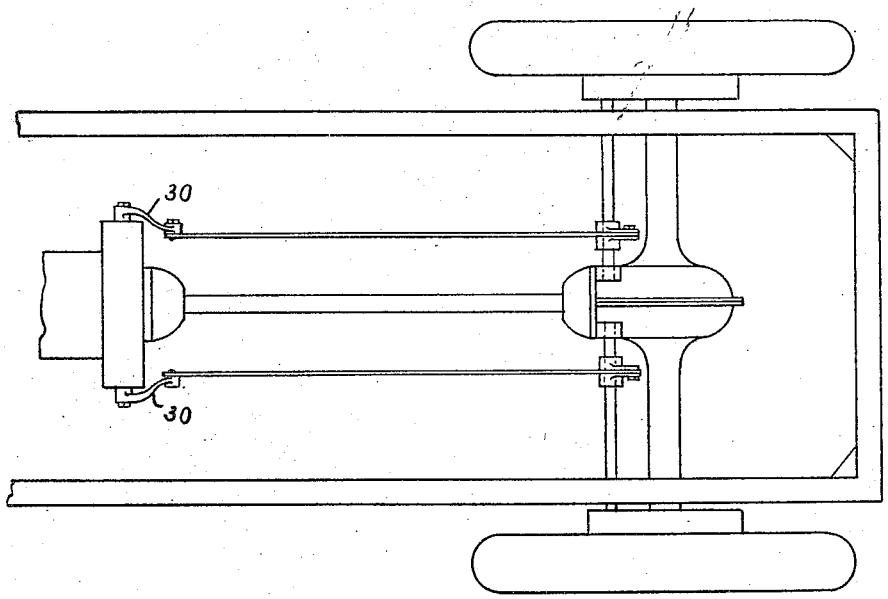

Oct. 19, 1926.
B. LIEBOWITZ
1,603,964
BRAKE
Filed March 30, 1925     3 Sheets-Sheet 1
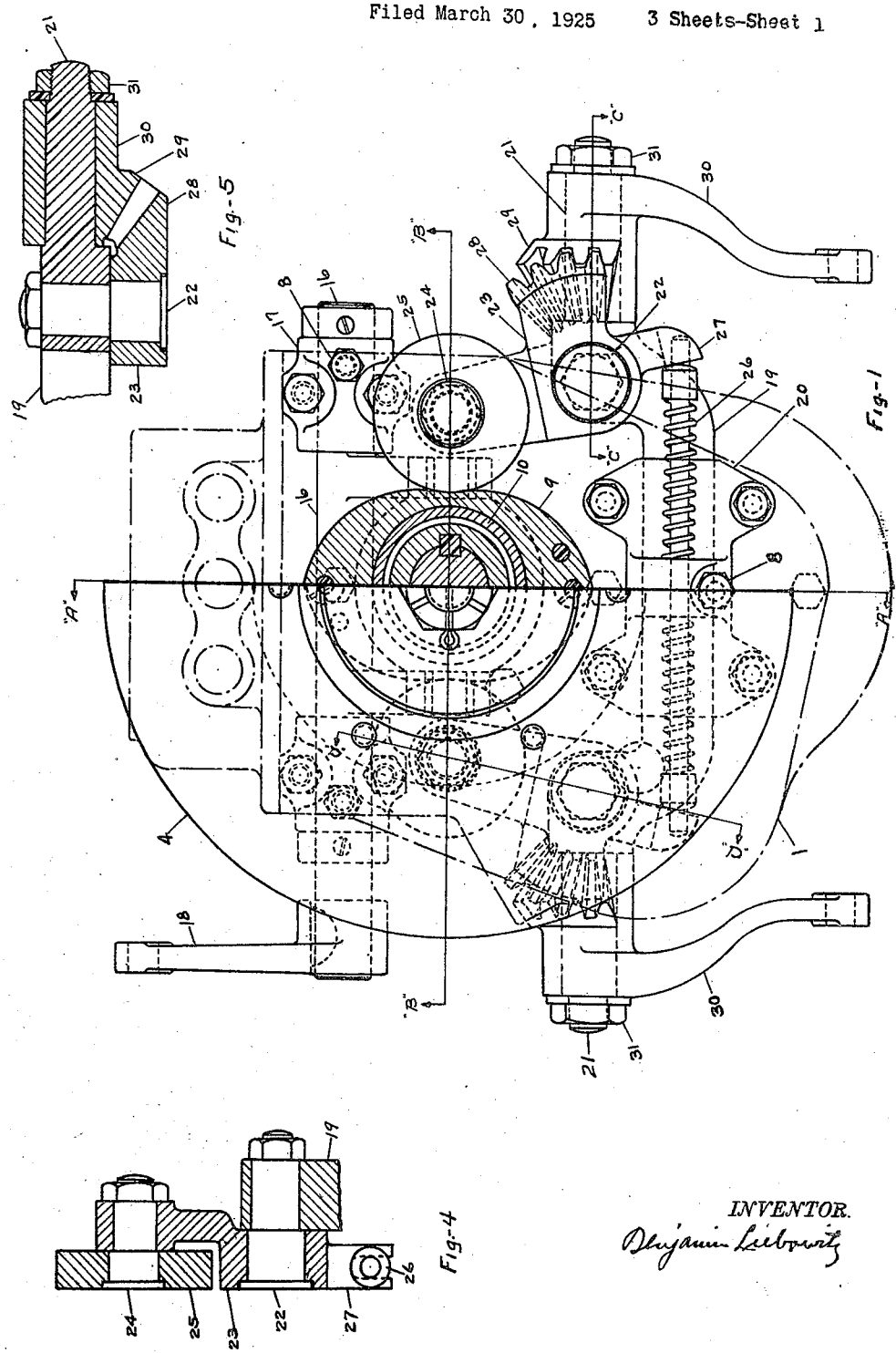
INVENTOR.
Benjamin Liebowitz

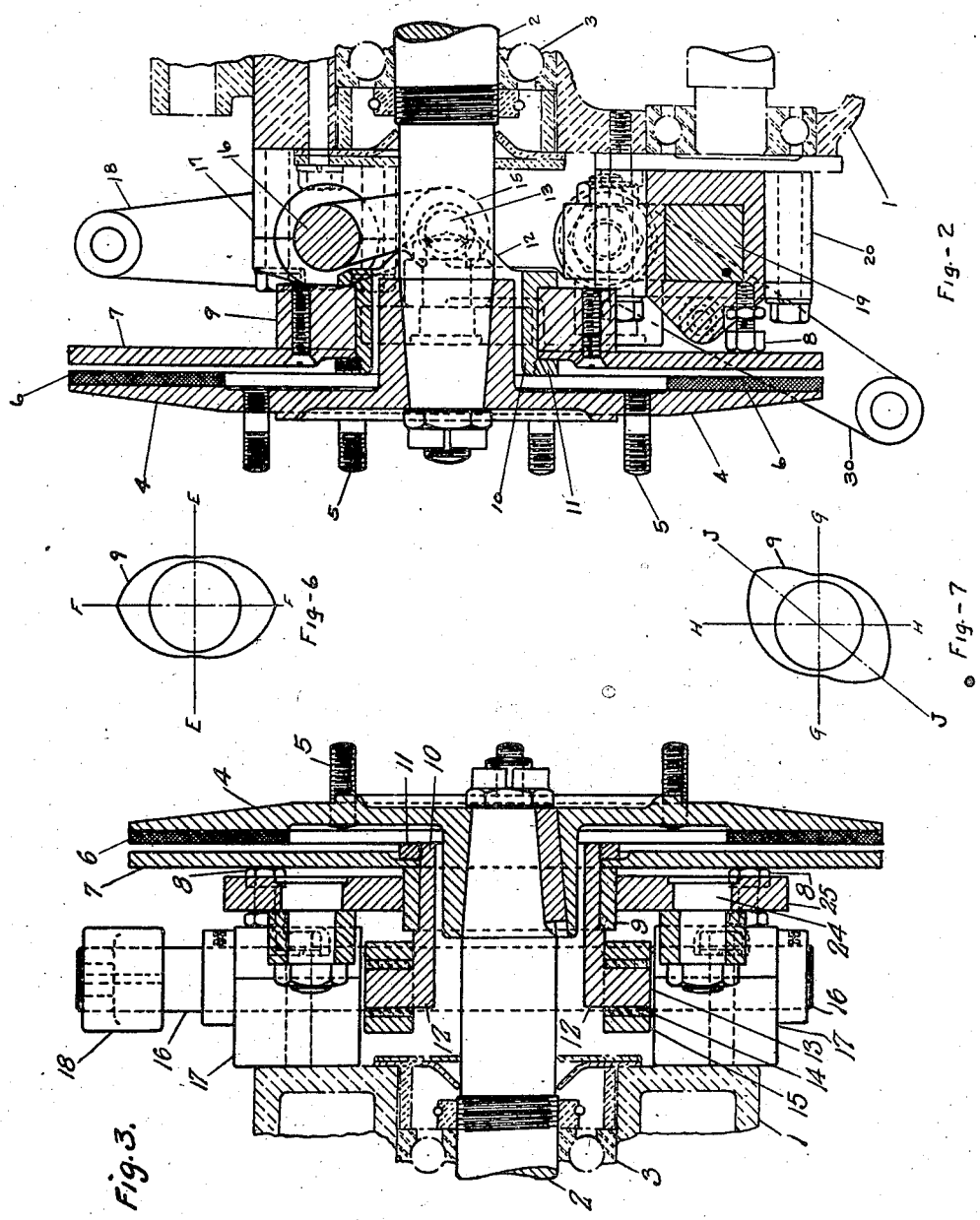

INVENTOR
Benjamin Liebowitz
BY
ATTORNEY

Patented Oct. 19, 1926.

1,603,964

UNITED STATES PATENT OFFICE.

BENJAMIN LIEBOWITZ, OF PENNSIDE, PENNSYLVANIA.

BRAKE.

Application filed March 30, 1925. Serial No. 19,278.

My invention relates to brakes for motor vehicles, and more particularly to that type of brake whose reaction is employed to set another brake. The objects of my invention are to provide a large increase in the amount of energy for braking purposes, to achieve this result by simple, inexpensive construction; and, in general, to provide a braking system for motor vehicles, especially for trucks and buses, which will be reliable both as regards setting and releasing, will require infrequent adjustment, and will not make heavy physical demands upon the operator in setting. These, and other objects, are achieved in the construction, one form of which is shown in the accompanying drawings, in which:

Fig. 1 is an end elevation, partly cut away.
Fig. 2 is a section on line A—A of Fig. 1.
Fig. 3 is a section on line B—B of Fig. 1.
Fig. 4 is a section on line D—D of Fig. 1.
Fig. 5 is a section on line C—C of Fig. 1.
Fig. 6 is a detail of the cam.
Fig. 7 is a view of a modified cam.
Fig. 8 is a diagrammatic plan view showing the device located on a motor vehicle and its connections to the wheel brakes thereof.

Referring to the drawings, in which I have shown a form adapted to be mounted on the rear end of the transmission of a motor vehicle, 1 represents a fragment of motor vehicle transmission, with main shaft 2 and rear bearing 3. Fastened to the end of the shaft in the usual way is a flanged hub 4, having studs 5 to receive a universal joint of a propeller shaft (not shown). It will be seen that 4 is directly connected with the propeller shaft, and therefore rotates whenever the vehicle is in action. The flange is larger in diameter, however, than the customary universal-joint hub-flange, and carries a friction disc-lining 6. A second disc 7 is arranged close to the lining 6, the clearance being adjustable by means of bolts 8. Fastened to disc 7 is a two-lobed symmetrical cam 9, which, together with disc 7, is rotatably supported on carrier 10 and held thereon by threaded ring 11. The inside diameter of carrier 10 is large enough to afford clearance at all times between it and the hub of 4.

The carrier 10 has two ears 12 formed with pins 13 working freely in bushings 14 which are carried in the ends of arms 15 extending from the shaft 16 which shaft is carried in bearings 17 mounted on the transmission case 1. Keyed on the end of 16 is lever 18, which is connected by rod or cable, or in any other suitable manner to the brake-pedal or hand brake (not shown). The usual spring (not shown) which serves to keep the brake-pedal in its neutral position may also serve to hold lever 18 back, so as to press disc 7 firmly against the clearance-adjusting bolts 8. The disc 7 is thus held normally out of contact with lining 6 and no part of its mounting contacts with rotating parts. When, however, lever 18 is pulled forward by depressing the brake-pedal, disc 7 is brought into contact with the lining 6, and if the vehicle is in motion, or tends to move, 7 tends to be carried around with 6, thereby rotating cam 9 through an angle of not more than 90°.

19 is a square-sectioned equalizing bar slidably mounted in bracket 20 carried on the transmission case. This bar is bent upward near its ends, which ends are formed into spindles 21. Also, two holes are bored in bar 19 to receive the two pins 22 which serve as pivots for the pair of arms 23. Each arm 23 in turn carries a pin 24 and roller 25. The two rollers 25 are pressed against diametrically opposite points of cam 9 by means of springs 26 acting on extensions 27 of arms 23.

Each of the arms 23 has an extension 28 forming a bevel-gear sector. This sector meshes with a corresponding sector 29 formed on an extension of each of the two levers 30, which are bored to turn freely on the spindles 21, and are held thereon by nuts 31. The eye-ends of the levers 30 are connected up to the wheel-brakes in any desired manner. In the case of four-wheel brakes, for example, one of the levers 30 may be connected with the front wheel brakes, and the other with the rear-wheel brakes.

The mode of operation is as follows: When the vehicle is moving or tends to move and the operator depresses the brake-pedal (or hand-lever, as the case may be), lever 18 is pulled forward, thereby moving the arms 15 backward and pressing disc 7 against brake-lining 6 with a force depending on the pedal pressure. Flange 4, being directly connected to the propeller shaft, is in motion or tends to move, so that disc 7 tends to be rotated by flange 4. Cam 9 is thereby rotated, thus forcing the rollers 25 apart, causing arms 23 to rotate on their pivots 22. The bevel-gear pairs 28—29 thereby rotate levers 30 about their pivots 21, and this movement sets the wheel-brakes according to the connections between levers 30 and the wheel-brakes. When this action has proceeded to the point where all slack in the connections and all clearances have been taken up, the brake-setting forces acting on the eye-ends of levers 30 through the chain of mechanism induce a reaction between rollers 25 and cam 9 and prevent further rotation of the latter, so that slipping thereafter occurs between disc 7 and lining 6. It will readily be seen that the brake-setting forces exerted by levers 30 are proportional to the pull on lever 18, other things being equal, provided that cam 9 is of constant rise.

Either by suitable arrangement of the brake-connectors, or by means of stops arranged in any convenient manner, cam 9 is prevented from rotating beyond the angle of maximum rise.

When the operator releases the brake-pedal (or hand brake) the pull of the brake-connections on levers 30, aided by springs 26, tends to restore the system to its neutral or non-operative position, by the pressure of rollers 25 against cam 9. That this may be accomplished, there must be no binding forces in the mechanism, and the angle of the cam 9 must be sufficiently large, with due regard paid to diameters of rollers 25 and pivots 24. These conditions are fulfilled in the construction shown.

It should be observed, in the first place, that the forces exerted by the levers 30 are equalized by virtue of the equalizer bar 19. If each of the levers 30 is connected to a rear-wheel brake, no further equalization is necessary.

In the second place, by virtue of this equalization, no binding forces are brought into action between cam 9 and carrier 10. Were it not for this equalization, high bearing pressures would be induced between 9 and 10, and these pressures would oppose the release of the brake; hence, the tendency of the brake to stick is obviated by the balanced reaction of the two rollers 25 on the cam 9. Complete release of the brake is therefore assured by the pressure of the rollers 25 on cam 9 caused by springs 26, especially in view of the very liberal roller diameters and cam angle. so that the lines of action of the resultant restoring forces are far outside the cone of friction.

In the third place, because of the symmetry of the cam, the brake functions equally well, whether the vehicle is going forward or backward.

In the fourth place, the cam has a useful angle of rotation of almost 90°, and it is fundamentally because of this large angle of rotation that this pilot power brake is able to deliver so much energy.

In the form shown in Figs. 1 to 6 inclusive, the cam 9 as illustrated in Fig. 6 is symmetrical about axes E E and F F; this means that the forces exerted by levers 30 will be identical, irrespective of whether the vehicle is going forward or backward. By the use of an asymmetrical cam, however, as shown in Fig. 7, the braking energy available for forward motion may be increased, at the expense of energy available for backward motion braking.

My invention is shown in this specification as mounted at the rear end of the transmission, but it will be understood that it may be mounted at either end of, or at any convenient point along the propeller-shaft, or any other shaft permanently connected with or geared to the wheels. Furthermore the invention is not to be construed as limited to the specific embodiment shown.

What I claim is:

1. In a motor vehicle braking system, the combination with a plurality of wheel-brakes, brake-setting linkage for setting said brakes, and a shaft in permanent connection with the driving wheels, of a flange mounted on said shaft, a companion disc rotatably and concentrically supported and arranged for frictional engagement with said flange, means for effecting said frictional engagement, a two-lobed cam carried by said disc and arranged for large angles of rotation, a pair of cam-followers bearing on said cam at diametrically opposite points, and balanced expanding means operated by said cam-followers, and arranged to actuate said brake-setting linkage.

2. In a motor vehicle braking system, the combination with a plurality of wheel-brakes, a brake-setting linkage for setting said brakes, and a shaft in permanent connection with the driving wheels, of a flange mounted on said shaft, a companion disc rotatably and concentrically supported and arranged for frictional engagement with said flange, means for effecting said frictional engagement, a cam rotated by said disc, a pair of cam-followers diametrically disposed in relation to said cam, said cam being adapted to actuate said followers in either direction of rotation, an equalizing support for said cam-followers, and means for transmitting motions of said cam-followers to said brake-setting linkage.

3. In a motor vehicle braking system, the combination with a plurality of wheel brakes, brake setting linkage for setting said brakes, a transmission, and a transmission main shaft, of a flange mounted on said shaft, a carrier concentrically supported in relation to the shaft and having clearance therewith, a disc and cam rotatably supported on the carrier, means acting on the carrier for moving the disc into frictional contact with the flange, an equalizing bar slidably mounted on the transmission case, a pair of arms pivotally supported at spaced points on the bar, each of said arms carrying a cam roller which rollers bear on the cam at diametrically opposite points, resilient means acting on said arms to hold the rollers in contact with the cam, and a pair of brake actuating levers each rotatably mounted at an end of said equalizing bar and connected with the cam roller arms to be positively rotated by the movements thereof.

4. In a brake setting mechanism, a rotating member, a cam, means for angularly rotating the cam by frictional contact with the rotating member, a pair of cam-followers bearing on the cam at diametrically opposite points, a laterally movable equalizing bar, a pair of brake actuating levers one rotatably mounted at each end of the bar, a pair of arms pivotally mounted on the bar each carrying one of the cam-followers, resilient means acting on said arms to hold the followers in contact with the cam, and geared connections between the arms and the levers whereby movements of the former impart rotary movements to the latter.

5. In a brake setting mechanism, an angularly movable cam, a pair of cam-followers bearing on the cam at substantially opposite points, a laterally movable support, a pair of arms pivotally mounted on said support each carrying one of the cam-followers, and resilient means for holding the cam-followers in contact with the cam.

BENJAMIN LIEBOWITZ